United States Patent [19]

Matsubara

[11] 4,028,533

[45] June 7, 1977

[54] ROBOT MOVABLE IN A GROUP

[75] Inventor: Sueo Matsubara, Tokyo, Japan

[73] Assignee: Techno-Venture Co., Ltd., Japan

[22] Filed: Dec. 29, 1975

[21] Appl. No.: 644,469

[30] Foreign Application Priority Data

Dec. 31, 1974 Japan ............................ 50-3345
Dec. 31, 1974 Japan ............................ 50-3346
Dec. 31, 1974 Japan ............................ 50-3347
Dec. 31, 1974 Japan ............................ 50-3348

[52] U.S. Cl. ............................ 235/151; 180/98; 235/150.2
[51] Int. Cl.² ............................ B26D 1/02
[58] Field of Search ............................ 180/98; 235/150.2

[56] References Cited

UNITED STATES PATENTS

| 3,011,580 | 12/1961 | Reid ............................ 180/98 |
| 3,128,840 | 4/1964 | Barrett, Jr. ............................ 180/98 X |
| 3,337,866 | 8/1967 | Gisonno ............................ 180/98 X |
| 3,606,933 | 9/1971 | Rushing et al. ............................ 180/98 |
| 3,744,586 | 7/1973 | Leinauer ............................ 180/98 |

*Primary Examiner*—Eugene G. Botz
*Attorney, Agent, or Firm*—Dressler, Goldsmith, Clement, Gordon & Shore, Ltd.

[57] ABSTRACT

Robots in a group, each usually moving randomly in irregular directions but making a specific movement, upon detection by one of them, of any other robot of the group present within a certain distance, either to run away from or run after the detected other robot.

33 Claims, 13 Drawing Figures

ROBOT MOVABLE IN A GROUP

BACKGROUND OF THE INVENTION a. Field of the invention

The present invention relates to robots in a group, and more particularly it pertains to robots in a group which, though simple in arrangement, can be effectively used, for example, to let a single or plural mannequins displaced in a show window to make variation-rich movements; or to cause a vacuum cleaner to automatically move around on a floor for performing automatic cleaning of the foor; or to cause a game or play machine to make various interesting movements.

b. Brief description of the prior art

There has been proposed and brought into practice various types of exhibition devices, such as for use in show windows, designed for moving commodities in a fashionable manner to enchance the effect of the display of goods. Such known devices include an apparatus for causing a single or plural mannequins to move around on the floor of a show window. Such a prior art apparatus, however, is arranged merely so as to cause the goods or mannequins to move, in a simple manner, on a rail provided for guiding the movements of these goods or these mannequins. Therefore, form such known apparatus obtained only cyclic and monotonous movements, resulting in a poor effect of display, on the other hand, known such apparatus designed to cause goods to make a varying movements is complicated in its arrangement. Also, a known game or play device which is designed to make complex movements is very complicated structurally.

SUMMARY OF THE INVENTION

It is, therefore a primary object of the present invention to provide robots in a group in which each is simple in structure and which can automatically make a variety of random movement independently.

Another object of the present invention is to provide robots in a group of the type described above, each of which is arranged to move randomly in irregular directions, without the aid of any guide rail, but being capable of avoiding collision with other moving similar robots.

Still another object of the present invention is to provide a robot of the type described above, which has means of a simplified structure for identifying the positions of other similar robots relative to the first-occuring robot.

Yet another object of the present invention is to provide robots in a group of the type described above, in which each is arranged to run after or run away from another similar robot when the latter is detected to be present within a certain distance from the first-occurring robot.

A further object of the present invention is to provide a robot of the type described above, which has controlling means so as not to deviate from the area allowed for the robot to move around.

According to the teachings of the present invention, there may be realized robots in a group which automatically move by themselves on a foor in such a manner that when these robots are positioned outside a certain distance from each other, they move randomly in irregular directions, independently but that, when any one of them is within this distance from any other one, the first robot will run after this other robot and, that furthermore when this distance is within a further limited value, then the first robot will move automatically so as to avoid a collision with the other one.

These and other objects as well as the advantages of the present invention will become apparent by reading the following detailed description when taken in conjunction with the accompanying drawings.

DETAILED DESCRIPTION OF THE PREFERRED EMBODIMENTS

Figure 1:
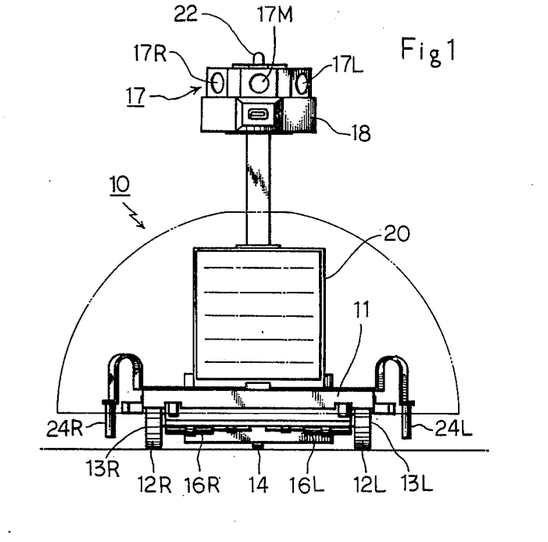
FIGS. 1 through 3 are an elevational view, a side elevation view and a top plan view, respectively, showing an example of the robot according to the present invention.
Figure 2:
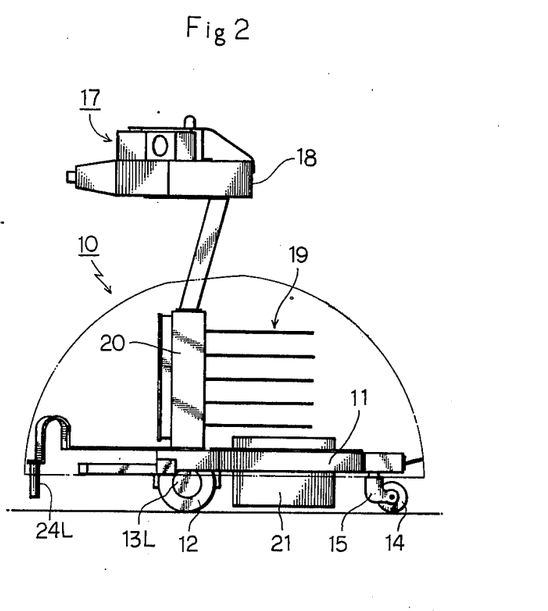
Figure 3:
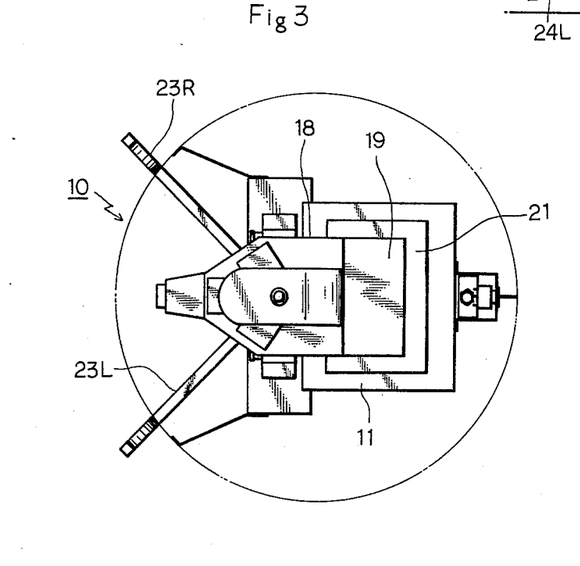

Referring now to FIGS. 1, 2 and 3, there is shown, generally at 10, an example of the robot according to the present invention. This robot 10 comprises: a main frame 11; a pair of driving wheels 12R and 12L which are respectively attached to the rotary shafts 13R and 13L of motors 16R and 16L provided on the main frame 11; and a free wheel 14 which is rotatably and laterally swingably attached to the rear portion of the main frame 11 by a laterally swingable supporting means 15. With the wheels 12R, 12L and 14 and the motors 16R and 16L provided for rotating the wheels 12R and 12L is constructed a moving means for causing the robot 10 to move. The robot 10 also includes: a sensing means 17 provided at the front side of a head portion 18 provided above the main frame 11, for sensing the infrared rays emitting from other robots of the group approaching the robot 10, and infrared ray radiating lamp 22 provided on top of the head portion 18; and a plurality of printed circuit carrying boards 19 detachably secured to a vertical frame 20 erecting from the main frame 11, the circuit boards 19 containing several electric circuits assigned for controlling the operation of the moving means. On the main frame 11, there is mounted a battery 21 which supplies the robot-moving power. At the foremost ends of both arms 23R annd 23L extending forwardly and divergingly from the front portion of the main frame 11 are provided sensing coils 24R and 24L for sensing an electromagnetic field radiating from, for example, a conductive wire not shown which is laid along the boundary line of a floor area where in the robot 10 is allowed to move around, and said wire is connected to a high-frequency generator (not shown).

Said infrared ray radiating lamp may be replaced by any other desired light-emitting source. It should be noted, however, that the use of infrared rays allows the sensing means to perform unfailing sensing of other similar robots without causing mis-sensing of any other light rays coming from other ambient light sources. Furthermore, instead of said infrared ray radiating lamp, there may be employed an infrared ray reflector. In this latter instance, it should be understood that the robot is to be provided with, in addition to the sensing means, an additional means for emitting an infrared rays, and the infrared rays reflected by this reflecting means from any other similar robot is received and sensed by the sensing means of the robot.

Description will hereunder be made on an example of the electric circuitry employed in the robot 10 of the present invention, the electric circuitry being assembled in the circuit boards 19 as described above.

Figure 4:
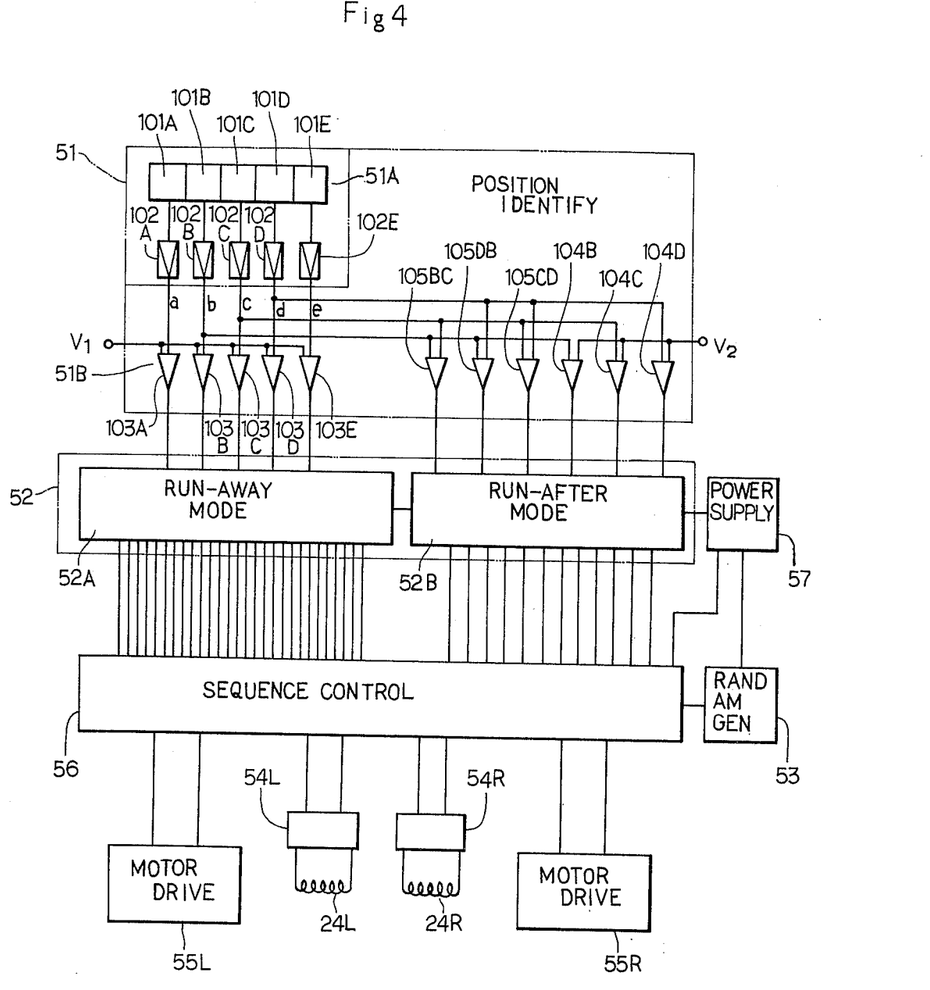
FIG. 4 is a block diagram showing an example of the whole electric circuitry employed in the robot of FIGS. 1 through 23 according to the present invention.

In FIG. 4 is generally shown the block diagram of the whole electric circuitry which comprises: a postion identifying circuit 51 for identifying the relative positions assumed by the other robots with respect to the first robot 10; a mode signal generating circuit 52 for generating run-after mode and run-away mode signals which define the movement mode of the robot 10; a random signal generating circuit 53 for generatng a random signal required to conduct the random mode of movement of the robot 10; boundary detecting circuits 54R and 54L for detecting the approach of the robot 10 toward the boundary line of the floor area allowed for the movement of the robot 10; motor driving circuits 55R and 55L; a sequence control circuit 56 for receiving said random mode signals, run-after and run-away mode signals, and boundary signals and for thereby delivering control signals to the motor circuitries 55R and 55L; and a power supplying circuit 57 containing said battery 21 for delivering the electric power to the respective circuits mentioned above.

The position identifying circuit 51 may be divided into two circuits, i.e. a sensing circuit 51A and a level comparison circuit 51B. The sensing circuit 51A is composed of plural photo-electricity converting elements 101A, 101B, 101C, 101D and 101E and amplifiers 102A, 102B, 102C, 102D and 102E for amplifying the outputs of these elements, respectively. While, the level comparison circuit 51B is comoprised of three sections: a first section consisting of comparators 103A, 103B, 103C, 103D and 103E each being assigned for comparing the DC- levels between a first set voltage VI and the respective outputs $a, b, c, d$, and $e$ of the amplifiers 102A, 102B, 102C, 102D and 102E; and second section consisting of comparators 104B, 104C and 104D each being assigned for comparing the DC-levels between a second set voltage V2 having a level lower than that of the first set voltage ad the respective output $b, c$, and $d$; a third section consisting of comparators 105BC, 106DB and 105CD for comparing the DC-levels of the outputs $b$ with $c$, $d$ with $b$ and $c$ with $d$.

Figure 5:
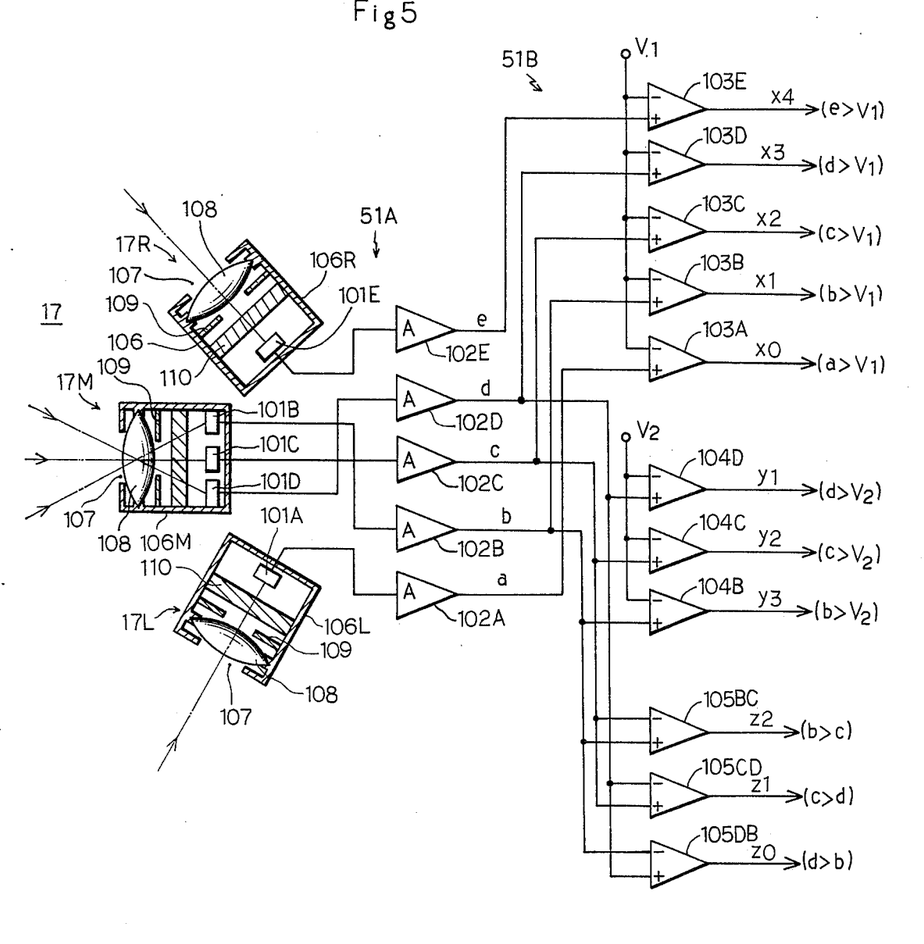
FIG. 5 is a circuit diagram showing an example of concrete circuit of the circuit block of FIG. 4, for use in identifying the relative positions of other similar robots to the first-occuring robot.
Figure 6:
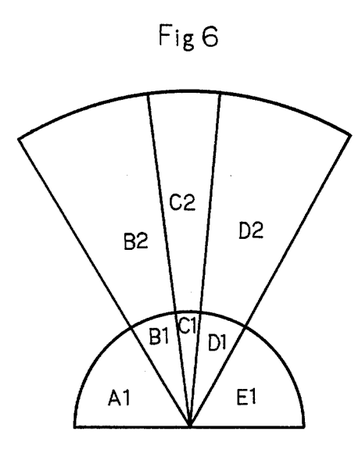
FIG. 6 is a chart for explaining the function of the identifying circuit shown in FIG. 5.

In FIG. 5 is shown in more detail the position identifying circuitry 51 of FIG. 4 together with an example of the concrete arrangement of the sensing means 17 of FIGS. 1–3. The sensing means 17 is formed into three separated units 17L, 17M and 17R having like hollow casings 106L, 106M and 106R, these units being mounted at the head portion 18 as shown in FIG. 1. Each of the casings 106R, 106M and 106L has an opening 107 at the front end portion thereof, a convex lens 108 fixed in the casing to face this opening 107, a slit plate 109 disposed behind the lens 108, and a filter 110 positioned behind the slit plate 109, which filter permits only infrared rays to pass therethrough. Behind the filter 110 in the casings 106R and 106L are provided the sensors 101E and 101A respectively, which may be photo-electricity converting elements responsive to infrared ray. The three sensors 101B, 101C and 101D are disposed laterally in line behind the filter 110 in the casing 106M. The sensing means 17 is adapted to receive and sense the infrared rays radiating from another robot which assumes a certain position in both a first sensing floor area consisting of sub-areas Al, Bl, Cl, Dl and El and in a second sensing floor area consisting of sub-areas B2, C2 and D2, both the first and the second floor areas, being defined as fan-shaped floor areas diverging forwardly from the head 18 of the robot 10 (see FIG. 6). More specifically speaking, the units 17R and 17L are respectively, assigned for the sensing in the subareas Al and El of the first sensing area; the unit 17M being assigned for the sensing in the sub-areas B2, C2 and D1 of the second area.

The first set voltage V1 is determined of its level so that, when the respective photo-electricity converting elements 101A–101E of the units 17R, 17M and 17L receive the infrared rays impinging thereonto from any other similar robots present in the first sensing area, the respective comparators 103A–103E, upon being inputted with the outputs $a, b, c, d$, and $e$ of the corresponding amplifiers 102A–102E, will deliver, respectively, the high level outputs thereof. While, the second set voltage V2 is adjusted of its level so that, when the respective photo-electricity converting elements 101B, 101C and 101D of the unit 17M receive the infrared rays from any other similar robots present in the second sensing area as well as the sub-areas B1, C1 and D1 of the first sensing area, the respective comparators 104B, 104C and 104D will deliver the high level outputs y1–y3. The respective comparators 105BC, 105CD and 105DB are adapted to deliver the high level outputs z0, z1, z2 respectively, under the conditions of the outputs $b>c, c,>d$ and $d>b$. The outputs of the level comparison circuit 51B are applied as the position pattern signals representing the patterns of the sensing areas in which other similar robots are present, to the mode signal generating circuit 52 shown in FIG. 4. This circuit 52 is composed of a first circuit 52A and a second circuit 52B, as can be easily seen in FIG. 4.

The first circuit 52A is provided there for generating a run-away mode signal whenever any other similar robot is present in the first sensing area. Said sequence control circuit 56, upon receipt of the run-away mode signal, will cause the motor driving circuits 55R and 55L to operate so that the robot which is present in the first area. Also, the second circuit 52B is adapted to generate a run-after mode signal whenever there is detected any other robot in the second sensing area. Upon receipt of the run-after mode signal, the sequence control circuit 56 will cause the motor driving circuit 55R and 55L to operate so that the robot 10 moves to run-after the other similar robot which is present in the second area.

Figure 7:
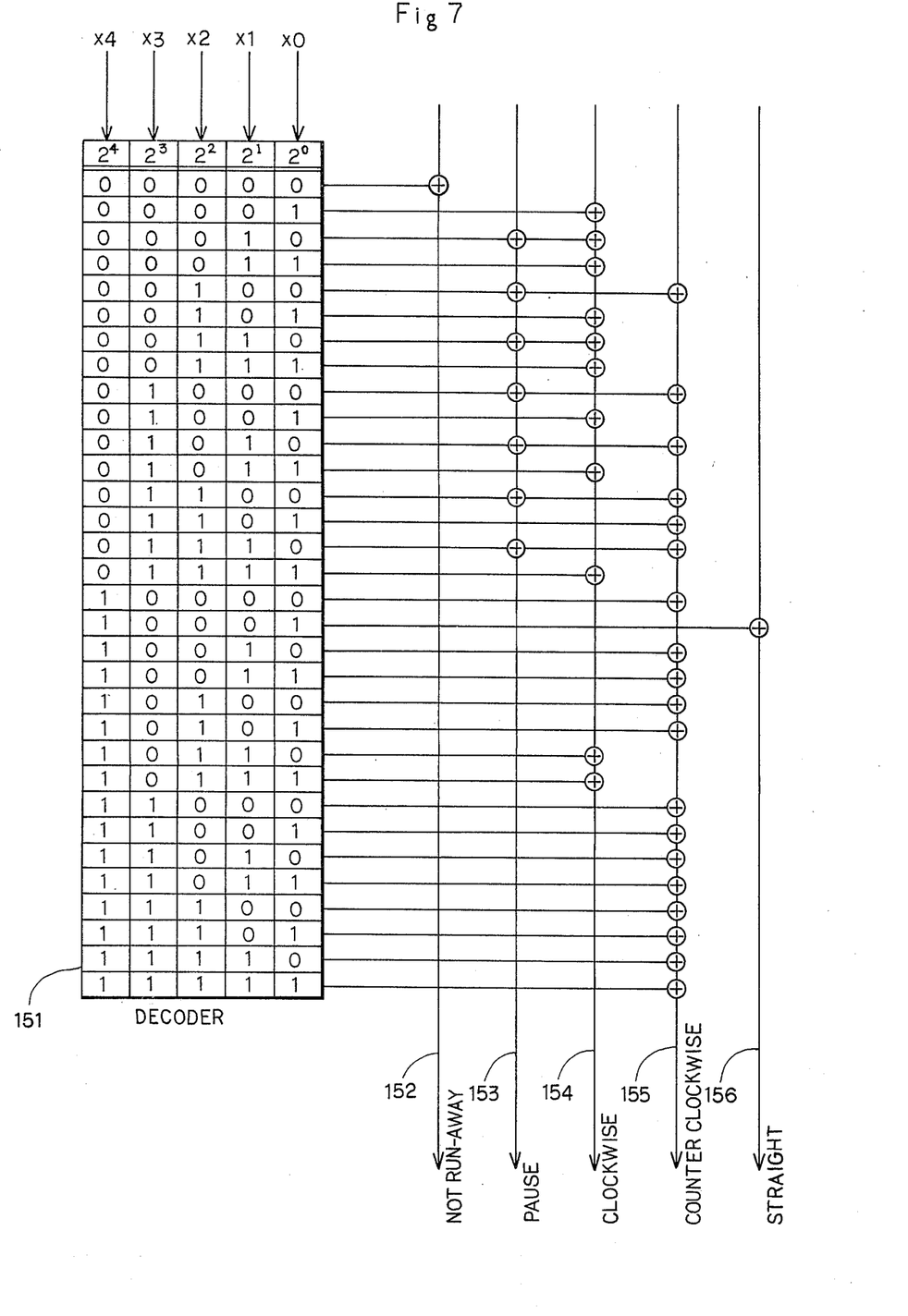
FIGS. 7 and 8 are circuit diagrams showing examples of concrete circuits of the operation mode signal generating circuity of FIG. 4.

Referring now to FIG. 7, the first circuit 52A consists of a binary to decimal converting circuit 151 of five bits and the five output lines 152, 153, 154, 155 and 156 thereof to which are delivered decimal outputs in such a manner as shown in FIG. 7. The respective outputs $x0$, $x1$, $x3$, $x4$ of the comparators 103A–103E in FIG. 5 are respectively inputted to the binary inputs for respective digits of the circuit 151. For instance, when all of the outputs $x0$–$x4$ are low in level, the level of the line 152 will become high; and when the level of only $x1$ is high, the levels of both lines 153 and 154 will become high; when the level of only $x3$ is high, the levels of both lines 153 and 155 will become high; when the level of only $x4$ is high, the level of the line 156 will become high, and so on.

Figure 8:
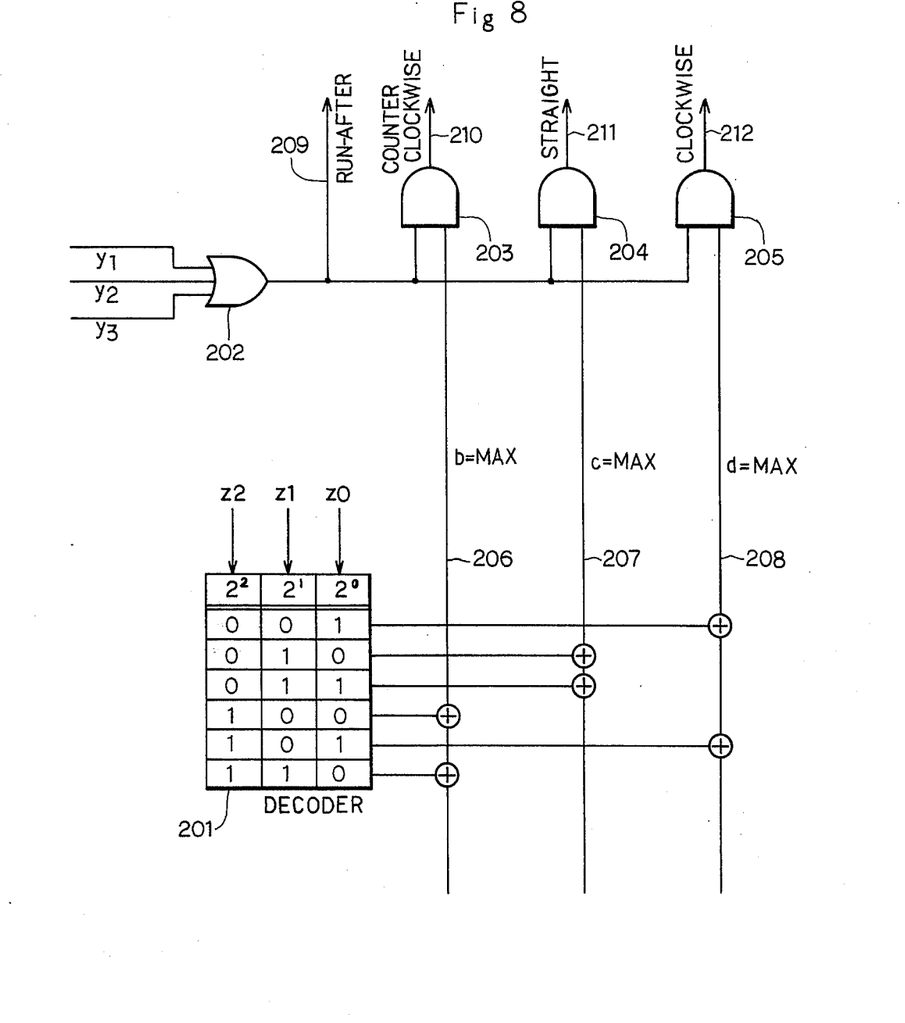

In FIG. 8 is shown an example of the second circuit 52B of the mode signal generating circuit 52. This circuitry 52B for generating run-after mode signals includes: a binary to decimal converting circuit 201 of three bits, the circuit 201 for receiving the outputs i $x0$, $x1$ and $x2$ of the comparators 105DB, 105CD annd 105BC in FIG. 5 as the inputs for the respective bits thereof; an OR gate 202 which receive, as its inputs, the outputs $y1$, $y2$, $y3$ of the comparators 104D, 104C, 104B respectively, and AND gates 203, 204 and 205. the outputs of the coverting circuit 201 are applied, via lines 206, 207 and 208, to the gates 203, 204 and 205 in such manner as shown in FIG. 8 together with the output of the gate 202. And also, there are provide aline 209 applied with the gate 202 output and lines 210, 211 and 212 for delivering the outputs of the respective gates 203, 204 and 205. This circuit 52B functions as follows. Under the conditions that either the outputs $y1$ or $y2$ or $y3$ is of a high level, the level of line 209 is rendered high, and the gates 203, 204 and 205 all will become open. In this state, the respective outputs delivered from the converting circuit 201 can be delivered onto the respective lines 210, 211 and 212 via the lines 206, 207 and 208 and the gates 203, 204 and 205, respectively. For instance, when the output $z0$ has a high level, the line 210 will have a high level. On the other hand, all of the lines 209, 210, 211 and 212 will remain at a low level when neither the output $y1$ nor the outputs $y2$ nor $y3$ has a high level.

Figure 9:
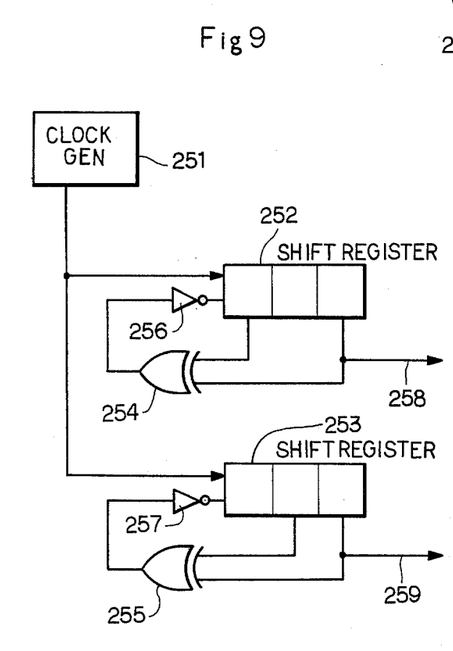
FIG. 9 is a circuit diagram showing an example of concrete circuit of the random signal generating circuitry of FIG. 4.

FIG. 9 shows a simple example of the random signal generating circuit 53. This circuit is composed of a clock pulse generator 251, shift registers 252 and 253, exclusive OR gates 254 and 255, phase inverters 256 and 257, and out- put lines 258 and 259. The clock pulse generated by the generator 251 is used as the shifting pulse for the shift registers 252 and 253. To the exclusive OR gates 254 and 255 are respectively inputted, for example, both the first and third bit outputs and both the second and third bit outputs of the registers 252 and 253, and the outputs of the gates 254 and 255 are respectively inputted, after a phase-inversion through the invertors 256 and 257, to the resisters 252 and 253. The third bit outputs of both the registers 252 and 253 is delivered as random signals onto the lines 258 and 259, respectively. The random signals are applied to the sequence control circuit 56 for making the random-mode movement of the robot 10, i.e. the sequence control ciruit 56 will, upon receipt of only said random signal, control the operation of the motor driving circuit 54R and 54L in such a way that the robot 10 is caused to move randomly in response to said random signal.

Figure 10:
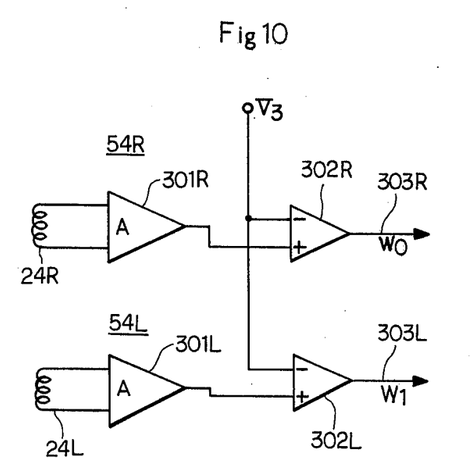
FIG. 10 is a circuit diagram showing an example of concrete circuit of the boundary line detecting circuitry of FIG. 4.

An example of the boundary detecting circuits 54R and 54L are shown in FIG. 10, which comprises amplifiers 301R 301L for amplifying the induced voltage in the sensing coils 24R and 24L, and comparators 302R and 302L for comparing the outputs of the amplifiers 301R and 301L with a third set voltage level. The third set voltage is adjusted so that the comparators 302R and 302L will deliver the positive outputs when the sensing coils 24R and 24L sense the electromagnetic field along the boundary of said floor area allowed for the robot movement. The outputs of the comparators 302R and 302L are applied, as a boundary signal, through lines 303R and 303L to the sequence control circuit 56. Upon receipt of this boundary signal, the sequence control circuit 56 will cause the motor driving circuits 54R and 54L to operate so that the robot 10 is caused to move away from the boundary of the floor area.

Figure 11:
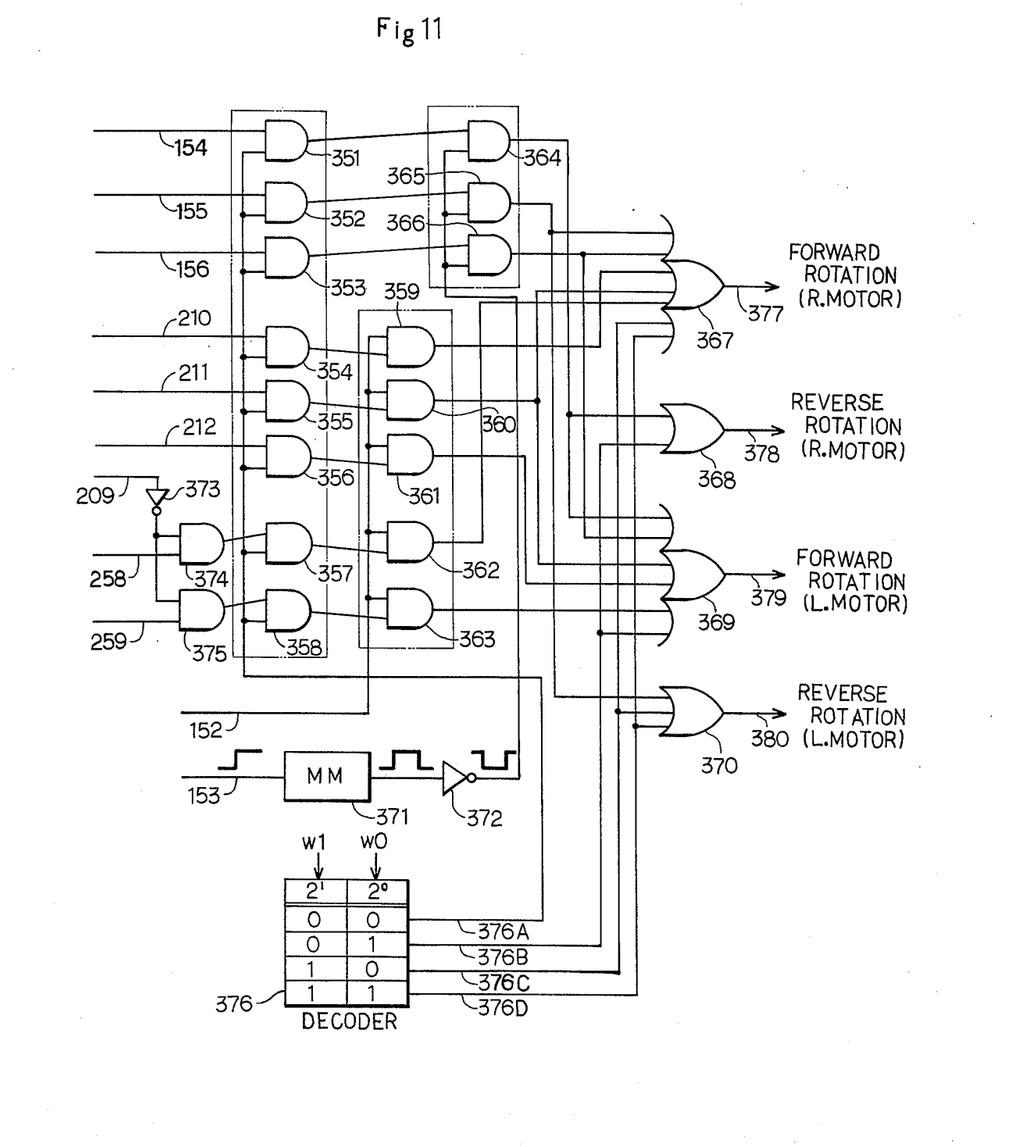
FIG. 11 is a circuit diagram showing an example of concrete circuit of the sequence control circuity of FIG. 4.

With reference to FIG. 11, description will be made on an example of the sequence control circuit 56. This circuit 56 includes a first group of AND gates 351–358, a second group of AND gates 359–363, a third group of AND gates 364–366, a fourth group of OR gates 367–370, a mono-stable multivibrator 371, inverters 372 and 373, AND gates 374 and 375, and a binary-decimal converting circuit 376 of two bits. The mono-stable multivibrator 371 delivers, upon each receipt of the signals on the line 153 of the circuit 52A in FIG. 7, a positive pulse having a constant pulse width. This pulse is applied to the respective gates 364–366 after a phase-inversion through the inverter 372 so that the gates 364–366 are closed while the positive pulse is delivered. The converting circuit 376 receives, as inputs, the signals on the lines 303R and 303L of the boundary detecting circuits 54R and 54L in FIG. 10 and thereby delivers output signal onto one of the output lines 376A–376D to control the conduction of the gates 367–370. In the instance wherein the level of the line 376A is low, the gates 351–358 are all closed. The conduction of the gates 359–363 is controlled by the level of the line 152 of the circuit 52A. The gates 374 and 375 for receiving, as inputs, the signals on the lines 258 and 259 of the random signal generating circuit 53 will respectively become open while the level of the lines are hold high. The output signals of the sequence control circuit 56 are delivered onto the line 377–380. These output signals are applied to the motor driving circuits 55L and 55R.

Figure 12:
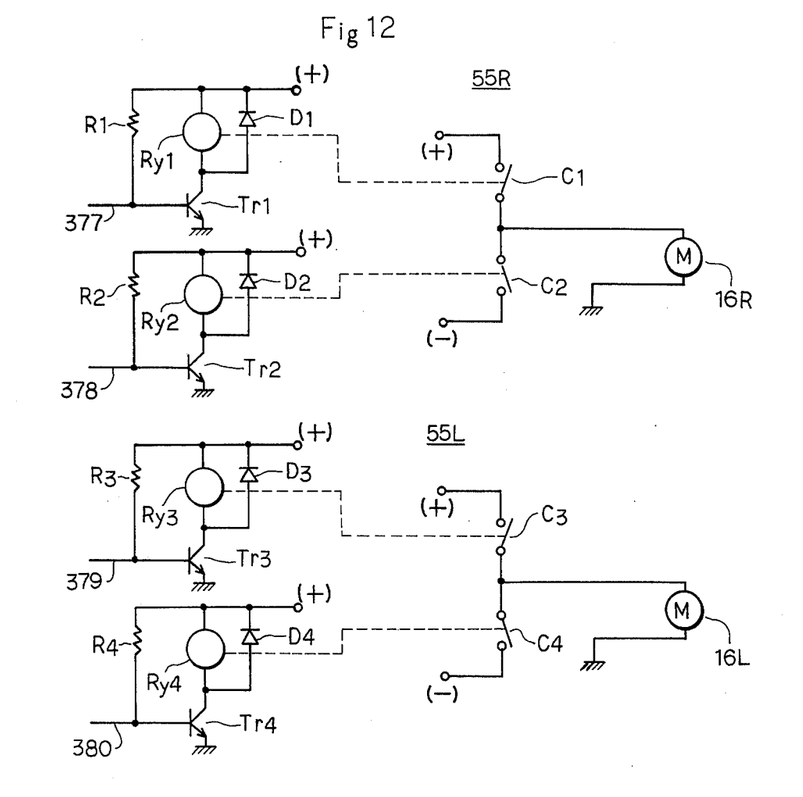
FIG. 12 is a circuit diagram showing an example of concrete circuit of the motor driving circuitry of FIG. 4.

As shown in FIG. 12, the motor driving circuits 55L and 55R may comprise: transistors $Tr^\epsilon$–$Tr4$ having relays $Ry1$–$Ry4$ connected in series in the collector circuits of these transistors. Through the make-contacts $c1$ and $c2$ of the relays $Ry1$ and $Ry2$, either a positive or a negative voltage from the power supplying circuit 57 may be applied to the right motor 16R for the driving thereof. Similarly, the left motor 16L may be driven with either a positive or a negative voltage applied thereto from the power supplying circuit 57 through the make-contacts $c3$ and $c4$ of the relays $Ry3$ and $Ry4$. Diodes $D1$–$D4$ may be connected in parallel with the respective relays $Ry1$ or $Ry4$ for protecting the transistor $Tr1$–$Tr4$ against the back electromotive force of the relays. Resistors $R1$–$R4$ are provided for biasing the transistors $Tr1$–$Tr4$. These transistors $Tr1$–$Tr4$ are controlled of their conduction in response to the levels of the lines 377–380.

Description will hereunder be made on the operation of the above mentioned robot 10 according to the present invention.

In the instance wherein there are no other robots present in the first and the second sensing areas of the sensing means 17 of the robot 10 itself and wherein the electromagnetic field representing the boundary of the moving area for the robot 10 is not sensed by the sensing coils 24R and 24L, the outputs $x0$–$x4$, $y1$–$y3$, and $z0$–$z3$ of the level comparison circuit 51B are all of a low level so that the line 152 only is of the high level among the lines 152–156 and 209–205 of the circuit 52 and that the line 376A of the circuit 376 in the circuit 56 is of a high level, and the lines 303R and 303L of the circuits 54R and 54L are of a low level. Accordingly, the gates 374, 375, 351–358 and 359–363 are opened, i.e. they are held in the conductive state, so that the random signals delivered onto the lines 258 and 259 of the circuit 53 are applied, through the conductive gates 357, 358, 362 and 363 and the OR gates 367 and 369, to the base electrodes of the transistors $Tr1$ and $Tr3$ of the circuits 55L and 55R. Thus, the respective transistors $Tr1$ and $Tr2$ are turned on and off at random and independently of each other in response to the random signals applied thereto, and thereby the contacts $c1$ and $c3$ of the relays $Ry1$ and $Ry3$ are turned on and off. As a result, the respective motors 16R and 16L are caused to rotate randomly in the forward direction. The robot 10, therefore, moves randomly in irregular directions, i.e. the robot 10 moves in a random mode.

When the robot 10 has approached near the boundary of the moving area the then the electro-magnetic field along the boundary has been sensed by one of the sensing coils 24L and 24L, it should be noted that for example, the circuit 376 will deliver an output signal onto the line 376B thereof so that the transistors $Tr2$ and $Tr3$ will be turned on to close the contacts $c2$ and $c3$. As a result, the left and the right motors 16L and 16R will rotate in the forward and reverse directions, respectively, so that the robot 10 will turn clockwise about the center axis thereof to run-away from the boundary line. This is the first run-away mode of the movement of the robot 10 according to the present invention. It can be easily understood that, in this state, the gates 374, 375, 351–363 are closed and accordingly the random signals are prevented from being applied to the driving circuits 55L and 55R.

If another robot of the present invention enters the sub-area A1, for instance, of the first sensing area for the sensing means 17, the sensor 101 of the sensing unit 17L will receive the infrared rays emitting from the lamp 22 of the another robot, and therefore the corresponding amplifier 102A will deliver an output $a$ having a higher level than that of the first set voltage V1. Accordingly, the comparator 103A will deliver a high level output signal $x0$. Whereupon, the levels of the lines 154 and 376A will become high and the transistors $Tr2$ and $Tr3$ will be turned on. Whereby, the robot 10 will turn clockwise about its center axis to avoide a collision with this another similar robot. This is the second run-away mode of movement of the robot 10. Needless to say, the random signals are inhibited at the gates 357 and 358 in this mode. Thereafter, if there is sensed the presence of no other robot in the first sensing area, the robot 10 changes its movement mode from this specific mode to the usual random mode mentioned above.

When, on the other hand, the sensing means 17 senses the presence of another robot in the second sensing area thereof, the robot 10 will take the following mode of movement, i.e. the robot 10 will move in such a way to run after this another robot at a certain distance left between the robot 10 and the another robot. More specifically, when another robot has entered the sub-sensing area C2 of the second sensing area, the amplifier 102C delivers an output signal $c$ of a level higher than that of the second set voltage V2 but lower than that the first set voltage V1 so that the comparator 104C and the comparator 105CD will deliver high level outputs $y2$ and $z1$, respectively. The levels of the lines 152, 209 and 211 will become high and the line 376A of the circuit 376 will have high level. Therefore, the transistors $Tr1$ and $Tr3$ are turned on and thereby the both motors 16R and 16L will rotate in the forward direction, thus causing the robot to move straight toward the another robot so as to run after it.

In case the another robot has been caught within the first sensing area by the run-after movement of the robot 10, the robot 10, in turn, will take the second run-away mode of movement. Let us now assume that the another robot has entered the sub-area C1, for instance, of the first sensing area. The levelsof lines 153, 154, 209 and 211 will become high so that the gates 374, 375 and 359–363 will be closed immediately and that the gates 364–366 will be closed during the period of time corresponding to the pulse width of the output of the mono-stable multivibrator 371. Thus, after a pause of the movement, the robot 10 will start to turn counter-clockwise about its center axis to avoide a collision against the another robot.

Let us also assume that two or more other robots enter the first and/or the second sensing area. For instance, when two other robots have entered, respectively, into the sub-area A1 and E1, the level of the line 156 will become high, with the result that the robot 10 will move straight forwardly.

In short, the movements of the robot according to the present invention may be divided roughly into the following three modes, i.e. the random mode, the run-away mode and the run-after mode. When there is no other robot present in the first and the second sensing areas of a first robot and when this first robot is positioned apart from the boundary of the area for the robot movement, the robot will take the random mode of movement in which this robot will move randomly in irregular directions and independently of the other robots. This robot, however, will take the run-away mode of movement, when there is present any other robot in the first sensing area of this robot. In such an instance, the robot will move so as to run-away from the other robot in the first sensing area, i.e. to avoid a collision against the other robot. Similarly, when the robot has approached the boundary, the robot will take the run-away mode and, accordingly, it will move away from the boundary. On the other hand, if any other robot has entered the second sensing area, the run-after mode is taken by the robot so that the robot moves to run after the other robot at a certain distance left between them.

Figure 13:
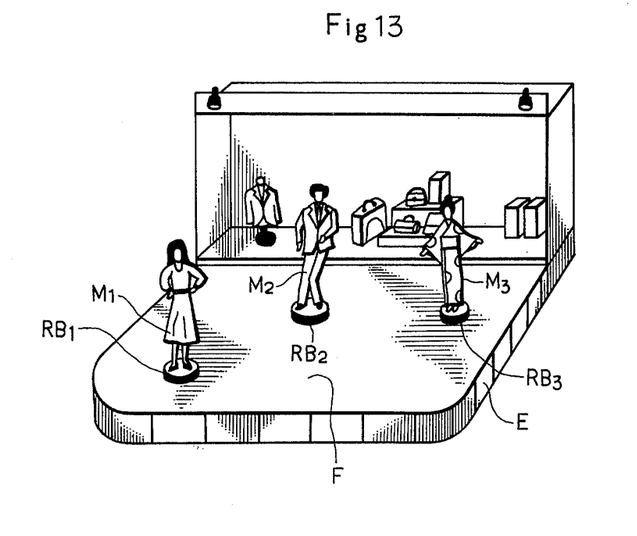
FIG. 13 is a perspective view showing a moving mannequin device utilizing an example of the robot according to the present invention.

Description will hereunder be made on an example of use of the robot according to the present invention. In FIG. 13, there is shown an example of a moving mannequin device employing the robots of the present invention. In the device, the mannequins M1, M2 and M3 are mounted on the robots RB1, RB2 and RB3, respectively. The robots RB1, RB2 and RB3 move around in irregular directions and independently of each other on the floor F while carrying the mannequins M1, M2 and M3. When the robots RB1, RB2 and RB3, i.e. the mannequins M1, M2 and M3 have moves close to the boundary area E of the floor F, they will start to move away from the boundary area E. And also, when one of the robots, e.g. the robot RB1 is moving into the second sensing area of another one robot, e.g. the robot RB2, this robot RB2 will move after that robot RB1. Moreover, when still another robot, e.g. the robot RB1 has entered the first area of the other robot, e.g. the robot RB3, this robot RB3 will move away from the robot RB1.

Thus, according to the present invention, there can be obtained a moving mannequin device in which the respective mannequins will move in an interesting fashion. More specifically, the mannequins will move randomly independently of each other at some time, and will move more or less groupwise at some time, and will move more or less groupwise at some other time. Needless to say, the robot of the present invention can be employed for various other uses.

I claim:

1. Robots movable in a group, each of said robots being movable in one of at least two different modes of movement at a time and comprising:
    identifying means for identifying the relative positions between this robot and the other robots of the group and for thereby generating a position signal representing the relative positions between said this robot and said the other robots of the group;
    mode control means operatively associated with said identifying means for selecting one mode at a time out of said at least two different modes in accordance with said position signal received from said identifying means and for thereby generating a mode signal corresponding to said selected mode; and
    moving means operatively associated with said mode control means for receiving said mode signal and for thereby actuating said this robot to move in one of said at least two modes which is selected by said mode control means.

2. Robots movable in a group according to claim 1, in which:
    said at least two modes of movement of each of said robots in the group includes a random mode which means that said this robot moves randomly in irregular directions independently of the other robots of the group, and a run-away mode which means that said this robot runs away from the other robots of the group which are present within a first area near said this robot to thereby avoide a collision against said the other robot;
    and in which; said indentifying means generates a first position signal when there is any other robot of the group present within said first area said this robot, and generates a second position signal when no other robot is present within said first area of said this robot;
    and in which, said mode control means generates, upon receipt of said first position signal, a run-away mode signal, and generates, upon receipt of said second position signal, a random mode signal;
    and in which: said moving means actuates said this robot, upon receipt of said run-away mode signal, to move in said run-away mode of movement, and actuates said robot, upon receipt of said random mode signal, to move in said random mode of movement.

3. Robots movable in a group according to claim 2, in which:
    each of the robots of said group further comprises a light-radiating means provided on the robot; and in which:
    said identifying means includes photo-sensing means sensitive to the light rays radiated from said light-radiating means, said photo-sensing means being disposed on the robot to face said first area to generate a sensing signal of a level corresponding to the amount of light rays passing through said first area and impinging onto said photo-sensing means;
    and in which; said first and second position signals are signals associated with said sensing signal.

4. Robots movable in a group according to claim 3, in which:
    said light-radiating means is means for radiating infrared rays, and
    said photo-sensing means is means sensitive to the infrared rays radiated from said light-radiating means.

5. Robots movable in group according to claim 2, in which:
    said moving means includes: a motor provided on the robot; a rotary wheel connected to the rotary shaft of said motor for rotation according to the rotation of said shaft, driving means for receiving said run-away mode signal and said random mode signal and for thereby driving said motor in response to said two mode signals received.

6. Robots movable in a group according to claim 2, in which:
    said mode control means includes:
    random signal generating means for generating random signals to be delivered out through gate means as said random mode signal; and
    run-away mode signal generating means for generating said run-away mode signal upon receipt of said first position signal, and for generating a gate control signal;
    said gate means being brought into the closed state upon receipt of said gate control signal.

7. Robots movable in a group according to claim 2, in which,
    said moving means includes: two motors provided on the robot; two rotary wheels connected to the rotary shafts of said motors, respectively, for rotation with the rotation of said shafts and disposed at substantially opposite positions with respect to the center axis of the robot; and motor driving means for driving one or both of said motors in response to said run-away and random mode signals.

8. Robots movable in a group according to claim 3, in which,
    said first area is divided into a plurality of sub-areas; and in which,
    said photo-sensing means correspond to said sub-areas and are disposed to face the respective sub-areas of said first area, respectively and generate sensing signals of levels corresponding to the amount of light rays impinging through said sub-areas of said first area onto said photo-sensing means, respectively, and in which: said first and second position signals are binary coded signals representing the presence of the other robots of the group within said sub-area of said first area, which binary coded signals being formed on basis of a set of said sensing signals of both said photo-sensing means.

9. Robots movable in a group according to claim 8, in which:
said identifying means further includes comparing means provided correspondly to said photo-sensing means for comparing the level of said sensing signals with a first reference voltage whose level is determined so that, when said respective sensing means receive the light rays radiating from said light-radiating means of the other robots of the group present within said first area of said this robot, said respective comparing means deliver out the output signal of a certain level;
said first and second position signals being binary coded signals representing the presence of other robots of the group in said sub-areas of said first area and which binary coded signals being formed on basis of a set of the output signals of said comparing means.

10. Robots movable in a group according to claim 8, in which:
said mode control means includes:
a first group and a second group of output lines;
random signal generating means for generating a pair of mutually independent random signals, said pair of random signals being delivered, as said random mode signal, through gate means of said mode control means onto said first and second group of output lines of said mode control means; and
run-away mode signal generating means operatively associated with said identifying means for generating said run-away mode signal upon receipt of said binary coded signal of said identifying means, and for generating a gate control signal, and for thereby delivering this run-away mode signal onto one or both of said first group and second group of output lines in correspondence to said received binary coded signal, said gate means being rendered closed upon its receipt of said gate control signal, and in which;
said moving means includes:
a first and a second motor provided on said robot;
a first and a second wheel disposed substantially at opposite positions with respect to the center axis of said motors and connected to the rotary shafts of said first and second motors, respectively, for rotation with the rotation of said motors; and
a first and a second motor dirving means operatively associated with said mode control means for receiving said random mode signal and said run-away mode signals correspondingly via said first and second groups of output lines, respectively, and for thereby driving said first and second motors in correspondence to said random mode signal and said run-away mode signal received by said first and second motor driving means.

11. Robots movable in a group according to claim 10, in which:
said run-away mode signal generating means includes:
means for receiving said binary coded signal from said identifying means and for thereby decoding the received said binary coded signal into a corresponding decimal signal,
said run-away mode signal being formed, by logical methods, on the basis of said decimal signal.

12. Robots movable in a group, each of said robots being movable in one of at least three different modes of movement at a time and comprising:
identifying means for identifying the relative positions of one of said robots with respect to the other robots of said group and for thereby generating a position signal representing the relative positions of said one of said robots with respect to the other robots of said group;
mode control means operatively associated with said identifying means for selecting one mode at a time out of said three different modes in accordance with said position signal received by this mode control means and for thereby generating a mode signal corresponding to the selected mode; and
moving means operatively associated with said mode control means for receiving said mode signal and for thereby actuating said one of said robots to move in said one mode selected by said mode control means.

13. Robots movable in a group according to claim 12, in which:
said identifying means generates a first position signal when there is any other robots of said group present within a first area near said one of said robots, and generates a second position signal when there is any other robots of said group present within a second area located beyond said first area of said one of said robots, and also generates a third position signal when there is no other robots of said group present within both said first and said second areas of said one of said robots, and in which:
said control means generates a run-away mode signal upon receipt of said first position signal, and a run-after mode signal upon receipt of said second position signal and not said first position signal, and also a random mode signal upon receipt of said third position signal, and in which:
said moving means actuates said one of said robots, upon receipt of said run-away mode signal, to move in said run-away mode away from the other robots of said group which are present within said first area of said one of said robots to thereby avoid the collision against said the other robots, and actuates said one of said robots, upon receipt of said run-after mode signal, to move in said run-after mode which mode means that said one of said robots runs after the other robots of said group which are present within said second area of said one of said robots, at a certain distance left between said one of said robots and said the other robots of the group, and also actuates said one of said robots, upon receipt of said random mode signal, to move in said random mode which mode means that said one of said robots moves randomly in irregular directions and independently of the other robots of said group.

14. Robots movable in a group according to claim 13, in which:
each of said robots of said group further comprises a light-radiating means provided thereon, and in which:
said identifying means includes photo-sensing means sensitive to the light rays radiating from said light-radiating means, said photo-sensing means being disposed so as to receive the light rays passing through said first and said second areas to generate a sensing signal whose level corresponds to the amount of light rays received by said photo-sensing means, and in which:

said first, said second and said third position signals are signals related to said sensing signal.

15. Robots movable in a group according to claim 13, in which:

said mode control means includes:

run-away mode signal generating means operatively associated with said identifying means for generating said run-away mode signal upon receipt of said first position signal;

run-after mode signal generating means operatively associated with said identifying means for generating said run-after mode signal upon receipt of said second position signal;

random signal generating means for generating random signals;

first gate means operatively associated with said identifying means for being rendered to the closed state upon receipt of said first position signal; and second gate means operatively associated with said identifying means for being rendered to the closed state upon receipt of said first and/or said second position signal, said run-after mode signal being delivered out, through said first gate means, from said mode control means, said random signals being delivered out as said random mode signal, through said second gate means, from said mode control means.

16. Robots movable in a group according to claim 14, in which:

said first and said second areas are respectively divided into plural sub-areas, and in which:

said photo-sensing means corresponding to said respective sub-areas of said first and second areas are disposed on the robot to face said respective sub-areas of said first and second areas and generate sensing signals of levels corresponding to the amount of light rays impinging onto said respective photo-sensing means through said corresponding sub-areas of said first and second areas, and in which:

said first, second and third position signals are binary coded signals representing the presence of the other robots of said group within said respective sub-areas of said first and second areas, which binary coded signals are formed on the basis of a set of said sensing signals of said photo-sensing means.

17. Robots movable in a group according to claim 16, in which:

said identifying means further includes:

first comparing means for comparing the levels of said sensing signals corresponding to said sub-areas of said first area with a first reference voltage whose level is determined so that, when said photo-sensing means receive the light rays radiating from said light-radiating means of the other robots of the group which are present within said sub-areas of said first area, said respective first comparing means will output the output signals of a certain level, and said first position signal being a first binary coded signal representing the presence of the other robots of the group within said sub-areas of said first area, said first binary coded signal being formed on the basis of a set of the output signals of said first comparing means.

18. Robots movable in a group according to claim 16, in which:

said identifying means further includes:

second comparing means for comparing the levels of said sensing signals corresponding to said sub-areas of said second area with a second reference voltage whose level is established so that, when said photo-sensing means receive the light rays radiating from said light-radiating means of the other robots of said group which are present within said sub-areas of said second area, said respective second means deliver out the output signals of a certain level; and third comparing means for comparing the levels of any two signals, for all such signals, of said sensing signals corresponding to said sub-areas of said second area, and for delivering out the output signals of a certain level when such two sensing signals are different in level from each other;

said second position signal being formed as a second binary coded signal representing the presence of the other robots of said group within said sub-areas of said second area, on the basis of said output signals of said third comparing means.

19. Robots movable in a group according to claim 16, in which:

said first and second areas, when combined, include plural fan-shaped areas diverging at a certain radius from substantially the center of said robot, said first area including portions of said fan-shaped areas located within a first distance from said center of said robot, said second area consisting of those portions of said fan-shaped areas located beyond said first distance from said center of said robot, and in which:

said photo-sensing means are positioned substantially at said center of said robot.

20. Robots movable in a group according to claim 15, in which:

said run-away mode signal generating means includes:

first means for receiving said first binary coded signal from said identifying means and for thereby decoding said received first binary coded signal into a corresponding decimal signal, said run-away mode signal being formed, by a logical method, based on said decimal signal of said run-away mode signal generating means, and in which:

said run-after mode signal generating means includes:

second means for receiving said second binary coded signal from said identifying means and for thereby decoding said received second binary signal into another corresponding decimal signal, said run-after mode signal being formed, by a logical method, based on said another decimal signal.

21. Robots movable in a group according to claim 19, in which:

said photo-sensing means corresponding to said sub-areas of said second area are common to some of said photo-sensing means corresponding to said sub-areas of said first area.

22. Robots movable in a group according to claim 2, each of said robots further comprising:

boundary detecting means for detecting the boundary of a movement area wherein said robots in group are allowed to move around and for thereby generating a boundary detecting signal representing the fact that the robot is positioned close to said boundary, and in which:

said mode control means further includes:

boundary mode signal generating means operatively associated with said boundary detecting means for generating a boundary mode signal upon receipt of said boundary detecting signal; and gate means for being rendered to the closed state upon receipt of said boundary mode signal;

said random mode signal and said run-away mode signal being delivered out, through said gate means, from said mode control means, and in which:

said moving means actuates said robot, upon receipt of said boundary mode signal from said mode control means, to move in a boundary mode of movement away from said boundary of said movement area.

23. Robots movable in a group according to claim 13, each of said robots further comprising:

boundary detecting means for detecting the boundary of a movement area wherein said robots in group are allowed to move around and for thereby generating a boundary sensing signal representing the fact that the robot is positioned close to said boundary; and in which:

said mode control means further includes:

boundary mode signal generating means operatively associated with said boundary detecting means for generating a boundary mode signal upon receipt of said boundary detecting signal; and gate means for being rendered to the closed state upon receipt of said boundary mode signal; said random mode signal, said run-away mode signal and said run-after mode signal which are delivered out, through said gate means, from said mode control means, and in which:

said moving means actuates said robot, upon receipt of said boundary mode signal from said mode control means, to move in a boundary mode of movement away from said boundary of said movement area.

24. A robot movable by itself within a given movement area without use of any guiding means for guiding the movement of the robot, comprising:

boundary detecting means for detecting the boundary of said movement area and for thereby delivering a boundary detecting signal representing the fact that the robot is positioned close to said boundary;

random signal generating means for generating a random signal;

mode control means for receiving said boundary detecting signal and said random signal and thereby generating a boundary mode signal upon receipt of said boundary detecting signal, and also generating a random mode signal in the absence of said boundary detecting signal; and moving means for receiving said boundary mode signal and said random mode signal and for thereby causing said robot, upon receipt of said random mode signal, to move in a random mode of movement, and also causing said robot, upon receipt of said boundary mode signal, to move in a boundary mode of movement, whereby in said random mode of movement the robot moves randomly in irregular directions in response to said random mode signal and, in said boundary mode of movement the robot moves away from said boundary which has been detected by said boundary detecting means.

25. A robot according to claim 24, in which:

said boundary detecting means includes:

a sensing coil for sensing an electro-magnetic field radiating along said boundary of said moving area and for thereby inducing a voltage;

an amplifier for amplifying said induced voltage in said sensing coil; and a comparator for comparing the level of said output of said amplifier with a reference voltage having a certain level which level is such that, when said sensing coil approaches very close to said boundary, said comparator will deliver out the output signal as said boundary detecting signal.

26. A robot according to claim 25, in which:

said random signal generating means includes:

at least two shift registers; a generator for generating a shifting pulse for said shift registers; phase invertors and exclusive OR gates arranged in series circuits, plural signals outputted from said respective shift registers being respectively fed, through said series circuits of the phase invertors and the exclusive OR gates, back to the input sides of said respective shift registers, said random signals being taken out from arbitrary points in said series circuits.

27. A robot according to claim 24, in which:

said moving means includes:

a pair of motors fixed on said robot;

a pair of wheels which are respectively connected to the rotary shafts of said motors for rotation in accordance with the rotation of said rotary shafts; and a motor driving circuit for receiving said boundary mode signal and said random mode signal and for thereby driving one or both of said motors in response to said boundary mode signal and said random mode signal, said wheels being desposed substantially at opposite positions with respect to the center axis of said robot.

28. A robot according to claim 24, in which:

said mode control means includes gate means for being rendered to the closed state upon receipt of said boundary detecting signal, said random signal being delivered out as said random mode signal, through said gate means, from said mode control means.

29. A method for controlling the movements of robots movable in a group, comprising:

identifying the relative positions between one of said robots and the other robots of the group and thereby generating a position signal representing the relative positions between said one of said robots and said the other robots of the group;

selecting one mode of movement, at a time, out of at least two different modes in accordance with said position signal; and moving this robot in said one mode which is selected.

30. A method according to claim 29, in which:

said at least two modes include a random mode, a runaway mode for avoiding the collision of said one of the robots against the other robots of the group, and a run-after mode for running after the other robots of the groups, selecting said run-away mode whenever said one of said robots identifies the presence of the other robots within a first area near this one of said robots to avoid the collision thereof against the othe robots, selecting said run-after mode whenever said one of said robots identifies the absence of the other robots within said first area and the presence of said other robots within a second area located beyond said first area, causing said one of said robots to run after the other robots, and selecting said random mode whenever said one of said robots identifies the absence of the other robots in not only the first area but also the second area, causing said one of said robots to move randomly in irregular directions.

31. A method according to claim 30, in which: said at least two modes further include a second run-away mode to keep the robots from surpassing a boundary which limits the range in which these robots are allowed to move, and at the arrival of any one of said robots at the boundary, said second run-away mode is selected in priority to the remaining three of the modes.

32. A method according to claim 30, in which:

when said run-away mode is selected, said one of the robots is halted temporarily, and thereafter when said one of the robots identifies that said other robots are still present in said first area, said one of the robots is caused to move away from the other robots.

33. Robots movable in a group according to claim 8, in which:

each of said sub-areas of said first area consists of a fan-like shape diverging at a certain radius substantially from the center axis of said robot; and said photo-sensing means are positioned substantially at said center axis of said robot.

* * * * *

UNITED STATES PATENT OFFICE
CERTIFICATE OF CORRECTION

Patent No. 4,028,533     Dated June 7, 1977

Inventor(s) Sueo Matsubara

It is certified that error appears in the above-identified patent and that said Letters Patent are hereby corrected as shown below:

In the title, "ROBOT" should be --ROBOTS--.

Column 1, line 26, "form" should be --from--;
          line 63, "foor" should be --floor--.

Column 2, line 16, "23" should be --3--;
          line 20, "occuring" should be --occurring--;
          line 25, "circuity" should be --circuitry--;
          line 33, "circuity" should be --circuitry--.

Column 3, line 63, "ad" should be --and--.

Column 4, line 28, after "sub-areas" insert --B1, C1 and D1 of first sensing area and the sub-areas--;
          line 29, "D1" should be --D2--;
          line 50, omit "," after "c", second occurence.

Column 5, line 23, after "outputs" delete "i";
          line 32, "provide" should be --provided--.

UNITED STATES PATENT OFFICE
CERTIFICATE OF CORRECTION

Patent No. 4,028,533          Dated June 7, 1977

Inventor(s) Sueo Matsubara

It is certified that error appears in the above-identified patent and that said Letters Patent are hereby corrected as shown below:

Column 6, line 53, "TR'" should be --TR1--.

Column 8, line 5, insert --as-- after "way".

Column 9, lines 19 and 20, delete "and will move more or less groupwise at some time,".

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*